Patented Dec. 30, 1947

2,433,765

UNITED STATES PATENT OFFICE 2,433,765

PHARMACEUTICAL COMPOSITION CONTAINING THEOPHYLLINE

John C. Krantz, Jr., Baltimore, Md., and James M. Holbert, Chattanooga, Tenn.

No Drawing. Application September 6, 1945, Serial No. 614,822

8 Claims. (Cl. 167—67)

This invention relates to a stable, soluble product containing theophylline, to compositions containing such a product and to methods of preparing the same.

Theophylline (1,3-dimethylxanthine) finds therapeutic utility primarily as a diuretic but is also employed as a myocardial stimulant and as a coronary dilator. However, the low solubility of theophylline in water (one part in 120) limits its usefulness. Much work has been done to increase the water solubility of theophylline. Thus, it has been suggested that theophylline should be used in the form of a double salt of theophylline and some solubilizing agent. Merck's Index mentions, as such solubilizing agents, calcium salicylate, diethanolamine, ethylene diamine, sodium acetate and sodium salicylate. Two such double salts are recorded in U. S. P. XII: theophylline ethylene diamine and theophylline sodium acetate.

The theophylline-ethylene diamine double salt is now on the market in the form of solutions preserved in sealed ampules to exclude the carbon dioxide of the air which precipitates free theophylline from solutions of the theophylline-ethylene diamine double salt. Further, when such a double salt is taken orally, the double salt is immediately decomposed by the acid in the stomach releasing free theophylline, which often results in gastric distress and nausea. Other known soluble double salts of theophylline are similarly decomposed in the stomach with frequent production of gastric distress and nausea.

We have now prepared combinations of amino acids such as glycine and/or their alkali salts with sodium or other alkali salts of theophylline that are characterized by greatly increased solubility in water. The aqueous solutions of these novel compositions are stable in the presence of the carbon dioxide of the air so that these compositions can be stored and marketed in the form of aqueous solutions contained in plain stoppered bottles rather than in sealed ampules. Further, the amino acid and/or alkali salt thereof neutralizes the acid in the stomach, so that free theophylline is not immediately liberated in the stomach on oral administration of our novel compositions with resultant gastric distress and nausea.

We have also admixed with the above disclosed composition containing glycine or other amino acid or alkali salt thereof in combination with an alkali salt of theophylline, a basic aluminum salt of glycine or other aliphatic amino acid, wherein said basic aluminum salt functions to neutralize the gastric acidity over a prolonged period of time, with the result that such a mixture can be administered orally without any danger of causing gastric distress or nausea at any time.

It is, therefore, an important object of the present invention to provide a stable, easily soluble theophylline composition that may be preserved and marketed in the form of an aqueous solution without the necessity of keeping such a solution in a sealed container.

Another important object of the present invention is to provide a theophylline composition that may be administered orally without causing gastric distress or nausea.

A still further object of the present invention is to provide theophylline compositions containing theophylline in the form of a sodium or other alkali salt in admixture with glycine or other aliphatic amino acid or an alkali salt of such acids and, preferably, in further admixture with a basic aluminum salt of glycine or a like aliphatic amino acid.

Another object of the present invention is to provide methods for the preparation of the above indicated pharmaceutical preparations.

Other and further objects and features of the present invention will become apparent from the following description and appended claims.

In preparing the pharmaceutical compositions of the present invention, we prefer first to form the sodium salt of theophylline by dissolving theophylline in an appropriate amount of an aqueous sodium hydroxide solution. To such a solution, we may add from about one-quarter to about four molar proportions (based upon the molar proportions of theophylline) of glycine or other aliphatic amino acid. Preferably, one mole of theophylline is dissolved in an aqueous solution of one mole of sodium hydroxide, and two moles of glycine are added to the resulting solution. The resulting clear solution of theophylline and glycine in aqueous sodium hydroxide may be evaporated to dryness in a steam bath, unless it is desired to use the product in the form of a solution. The product obtained from one mole of theophylline, one mole of sodium hydroxide and two moles of glycine is soluble in water to the extent of 17.6 grams in 100 c. c. A ten percent solution has a pH of 9. The composition is almost completely anhydrous and contains 51% theophylline, 42.4% glycine and 6.8% sodium. An assay for theophylline by the U. S. P.

method for theophylline in theophylline-ethylene diamine checks well with the calculated value. The value for sodium runs slightly low but is well within the experimental limit.

We believe that our novel composition formed by the interaction of glycine, theophylline and sodium hydroxide is a sodium salt of theophylline buffered by glycine. The correctness of this assumption is borne out by the following experiment. Four grams of theophylline were dissolved in 20 c. c. of 1.0 normal aqueous sodium hydroxide and diluted to 70 c. c. The sodium salt of theophylline then formed is not completely soluble, in the strict sense of that term, but takes the form of a ropy solution or dispersion. Glycine was added to the solution or dispersion of the sodium salt of theophylline in one-quarter molar units until the glycine-theophylline ratio was 5:1. The first addition of glycine caused the solution to clear.

When the 5:1 ratio was reached, theophylline began to separate from the solution. The pH of the solution after each addition of glycine was determined. The results are given below in tabular form.

| Moles Glycine | pH |
| --- | --- |
| 0 | 10.48 |
| ¼ | 9.72 |
| ½ | 9.50 |
| ¾ | 9.37 |
| 1 | 9.26 |
| 1¼ | 9.17 |
| 1½ | 9.12 |
| 1¾ | 9.06 |
| 2 | 9.01 |
| 2¼ | 8.98 |
| 2½ | 8.93 |
| 2¾ | 8.90 |
| 3 | 8.86 |
| 3½ | 8.82 |
| 4 | 8.77 |
| 5 | 8.69 |

If the glycine concentration is plotted against pH, a smooth curve of diminishing pH results. There is no break in the curve to indicate any compound formation.

The increased solubility of the theophylline when combined with glycine or some other aliphatic amino acid might conceivably be due to a reaction of the acidic hydrogen of theophylline with the amino group of glycine or sodium glycinate leading to the formation of an ammonium type salt comparable, for instance, to ethylene diamine diacetate. If this is indeed the case, glycine itself should be an excellent solubilizing agent. However, a combination of glycine and theophylline in a 2:1 molar ratio did not have the desirable properties of the glycine-theophylline-sodium hydroxide reaction mixture disclosed hereinabove.

Hereinabove, we have described our novel composition as prepared by the addition of glycine to the sodium salt of theophylline. However, the same composition may be prepared from sodium glycinate and theophylline. For instance, to prepare a solution similar to the fifth solution in the preceding table, we can dissolve two grams of sodium glycinate and four grams of theophylline in 60 c. c. of water at 50° C. This solution gives a pH of 9.22 as compared to the pH of 9.26 for the fifth solution in said table. To the resulting solution having a pH of 9.22, we can add 1.5 gram of glycine to effect a glycine concentratoin corresponding to the ninth solution in the preceding table. The pH of this solution was 9.00 as compared to 9.01 for the ninth solution. We therefore conclude that the same mixture is formed when a sodium salt of theophylline and glycine are mixed as when sodium glycinate and theophylline are mixed. This bears out our conclusion that the increased solubility and stability of theophylline in a sodium glycinate solution is due to the formation of sodium theophyllinate which, in turn, is buffered by the free glycine. As pointed out hereinabove, we have no evidence pointing to the formation of a definite compound.

In starting with sodium glycinate, we can, of course, increase the sodium content of the final mixture by the use of sodium glycinate in a molecular ratio in excess of 1:1 with respect to theophylline. For instance, to 0.05 mole (4.85 grams) of sodium glycinate in 10 c. c. of water we add enough theophylline (5.35 grams theophylline U. S. P.) to make a final mixture containing 50% anhydrous theophylline. The molar ratio then is approximately 2:1. This mixture is then evaporated to dryness on a water bath to yield a material soluble in water to the extent of 11.6 grams in 100 c. c. of water at room temperature. The saturated solution has a pH of approximately 10, and contains two moles of sodium per mole of theophylline, while the product prepared by the addition of glycine to a sodium salt of theophylline contains only one mole of sodium per mole of theophylline.

It is, of course, equally possible to dissolve theophylline in a solution of more than the amount of sodium hydroxide required for the formation of sodium theophyllinate. In this case, also, the resulting product will contain more than one mole of sodium per mole of theophylline. However, such products have a more objectionable taste than those prepared by the use of molar proportions of sodium hydroxide and theophylline.

Further, since glycine is marketed in the form of a free acid rather than its sodium salt, it is more convenient to prepare our nõvel pharmaceutical composition by the use of free glycine, theophylline and the minimum amount of sodium hydroxide required to form sodium theophyllinate.

It should be understood that in place of glycine we may substitute equivalent amounts of other amino acids such as alanine, valin, leucin, glutamic acid or the like, and that potassium hydroxide or other alkali hydroxide may be used in place of sodium hydroxide. In any case, we form an alkali salt of theophylline and incorporate with the same glycine or other amino acid in amounts sufficient to completely solubilize and to stabilize the sodium or other alkali theophyllinate. In place of glycine or other amino acid, we may use an alkali salt of the amino acid or a mixture of such alkali salt with the amino acid. The molecular ratio of such amino acid and/or alkali salt thereof to theophylline will vary somewhat, depending on the nature of the amino acid employed, but can easily be ascertained by carrying out a determination such as that described in column 3, lines 10 to 45, of this specification. The upper limit for the amount of amino acid to be added is set by the precipitation of free theophylline due to increased acidity when too much amino acid has been added.

By the methods disclosed, we have prepared theophylline compositions that are readily soluble in water, stable in aqueous solutions, and fit for oral administration.

The glycine and/or sodium glycinate content of these compositions serves to neutralize the acidity of the stomach at the time the compositions are administered. In order to render our compositions stable in the stomach for a prolonged period of time, we prefer to incorporate with the composition one or more of the basic aluminum salts of amino acids disclosed and claimed in the application by John C. Krantz, Jr., and Dorothy V. Kibler, Serial No. 590,720, filed April 27, 1945, and entitled "Pharmaceutical composition and method of preparing the same," now abandoned. Reference is made to said application for a full disclosure of the nature, therapeutic effects and methods of preparation of said basic aluminum salts of aliphatic amino acids, in particular, glycine. Very briefly, basic aluminum glycinate (dihydroxy aluminum glycinate) or like salts of aliphatic amino acids contain free amino groups that readily react with free acid in the stomach to form the corresponding amine hydrochloride. These basic aluminum salts also slowly hydrolyze in the stomach to form an alumina gel which has a prolonged continuous neutralizing action. We may incorporate with our novel theophylline compositions sufficient amounts of a basic aluminum salt of an aliphatic amino acid to insure that free theophylline will not be liberated in the stomach with consequent gastric distress and nausea. We may use from about one-half to five or more parts of basic aluminum glycinate or the like to each part of our novel theophylline compositions.

Many details of procedure and composition may be varied within a wide range without departing from the principles of this invention, and it is, therefore, not our purpose to limit the patent granted on this invention otherwise than necessitated by the scope of the appended claims.

We claim as our invention:

1. A pharmaceutical composition comprising glycine and sodium theophyllinate.
2. A pharmaceutical composition comprising sodium glycinate and sodium theophyllinate.
3. A pharmaceutical composition comprising glycine, sodium glycinate and sodium theophyllinate.
4. A pharmaceutical composition comprising an alkali salt of theophylline and an aliphatic amino acid.
5. A pharmaceutical composition comprising an alkali salt of theophylline and an alkali salt of an aliphatic amino acid.
6. A pharmaceutical composition comprising an alkali salt of theophylline, an aliphatic amino acid and an alkali salt of an aliphatic amino acid.
7. A pharmaceutical composition comprising one mole of sodium theophyllinate together with from one-quarter to four moles of glycine.
8. An aqueous solution of one mole of sodium theophyllinate and of one-quarter to four moles of glycine.

JOHN C. KRANTZ, Jr.
JAMES M. HOLBERT.

REFERENCES CITED

The following references are of record in the file of this patent:

U. S. Dispensatory, 23d ed. (1943), pages 1126, 1127.

Merck's Index, 5th ed. (1940), page 552.

Krantz et al., Journal of Pharmacology and Experimental Therapeutics, vol. 82, pages 247 to 253.